(12) United States Patent
Struebel et al.

(10) Patent No.: US 7,342,577 B2
(45) Date of Patent: Mar. 11, 2008

(54) LIGHT EMITTING DIODE DRIVING APPARATUS WITH HIGH POWER AND WIDE DIMMING RANGE

(75) Inventors: Mark A. Struebel, Desert Hills, AZ (US); Eric D. Ronning, Glendale, AZ (US); Dennis M. Davey, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 570 days.

(21) Appl. No.: 11/043,226

(22) Filed: Jan. 25, 2005

(65) Prior Publication Data

US 2006/0164377 A1 Jul. 27, 2006

(51) Int. Cl.
*G09G 5/00* (2006.01)
*G09G 3/36* (2006.01)

(52) U.S. Cl. .................. 345/204; 345/102; 345/82; 345/211; 345/207

(58) Field of Classification Search ............ 345/102, 345/36, 39, 44–46, 82, 211, 690, 204, 207, 345/691; 315/169.3, 291, 159, 307, 287, 315/246, 224, 273, 274; 362/611, 612, 555, 362/559, 561
See application file for complete search history.

(56) References Cited

U.S. PATENT DOCUMENTS

| 4,490,655 | A | | 12/1984 | Feldman |
| 4,581,544 | A | | 4/1986 | Feldman |
| 4,631,540 | A | | 12/1986 | Feldman |
| 5,391,934 | A | | 2/1995 | Feldman |
| 5,606,318 | A | | 2/1997 | Feldman |
| 5,754,013 | A | * | 5/1998 | Praiswater .................. 315/307 |
| 5,783,909 | A | | 7/1998 | Hochstein |
| 6,329,802 | B1 | | 12/2001 | Feldman |
| 6,396,217 | B1 | | 5/2002 | Weindorf |
| 6,411,042 | B1 | | 6/2002 | Cull et al. |
| 6,411,072 | B1 | | 6/2002 | Feldman |
| 6,563,479 | B2 | * | 5/2003 | Weindorf et al. ............. 345/77 |

(Continued)

OTHER PUBLICATIONS

PCT International Search Report PCT/US2006/000019, Jun. 19, 2006.

*Primary Examiner*—Jimmy H. Nguyen
(74) *Attorney, Agent, or Firm*—Ingrassia Fisher & Lorenz

(57) ABSTRACT

Apparatus are provided for driving an LED light source and controlling a light output of the light source over a wide luminance range in response to a luminance input. The apparatus includes: a voltage source having an output configured to couple with the light source, a first input configured to receive the luminance input, and a second input; a photodetector unit configured to logarithmically compress the luminance range and determine a voltage based on a luminance of the light source in the compressed range; a comparator having an input coupled to the photodetector unit and having an output; and, a signal converter having an input coupled to the output of the comparator and having an output coupled to the second input of the voltage source. The voltage source is configured to generate an output signal at the output of the voltage source. The output signal has a frequency and a pulse width based on the luminance input. The comparator is configured to determine an error signal based on a comparison of the luminance input with the voltage. The converter is configured to exponentially convert the error signal to the frequency.

20 Claims, 2 Drawing Sheets

U.S. PATENT DOCUMENTS

| | | |
|---|---|---|
| 6,666,567 B1 | 12/2003 | Feldman et al. |
| 6,724,158 B1 | 4/2004 | Feldman |
| 6,747,413 B2 | 6/2004 | Cull et al. |
| 7,183,727 B2 * | 2/2007 | Ferguson et al. ........... 315/308 |
| 7,262,560 B2 * | 8/2007 | Jaffar et al. .................. 315/291 |
| 2002/0118182 A1 * | 8/2002 | Luther Weindorf ......... 345/204 |
| 2003/0214242 A1 | 11/2003 | Berg-Johansen |

* cited by examiner

LIGHT EMITTING DIODE DRIVING
APPARATUS WITH HIGH POWER AND
WIDE DIMMING RANGE

FIELD OF THE INVENTION

The present invention generally relates to a display device, and more particularly, to method and apparatus for lighting and controlling lighting in the display devices.

BACKGROUND OF THE INVENTION

A display used in avionics environments (e.g., on board aircraft) may be operated in a variety of ambient lighting conditions. For example, a cockpit is generally brighter during a daytime flight than a nighttime flight, and the display may be required to generate a brighter image during the daytime flight than the nighttime flight. For each lighting condition, the display provides a sufficiently bright image for viewing by aircraft personnel.

Fluorescent lamps have been used as a light source for backlit displays. When increasing brightness of the backlit display, the fluorescent lamp phosphor tends to generate more heat, and operation of the fluorescent lamp at higher brightness may exceed the capability of the phosphor. To maintain efficiency, one common practice is to cool a portion of the fluorescent lamp to maintain a "cold-spot" which results in a lower overall temperature of the fluorescent lamp. With greater brightness demands, such as common with avionics displays, maintaining the cold-spot of the fluorescent lamp becomes increasingly more difficult.

Light-emitting diodes (LEDs) have been used as a light source for backlit displays and also generate heat when operating to provide increased brightness. In comparison with the fluorescent lamp, removing heat from an LED is more readily accomplished. The overall temperature of the LED is generally lower than the fluorescent lamp when operating under greater brightness demands.

Accordingly, it is desirable to provide an apparatus for powering an LED based light source and controlling an output thereof. In addition, it is desirable to provide an avionics light source having a broad dimming range and high brightness. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Apparatus and method are provided for driving a light source and controlling a light output of the light source over a wide luminance range. In one exemplary embodiment, an apparatus for driving a light source over a luminance range in response to a luminance input is provided including, but not limited to, a voltage source having an output configured to couple with the light source, a photodetector unit configured to logarithmically compress the luminance range within a voltage range and determine a luminance of the light source in the voltage range, a comparator having an input coupled to the photodetector unit and an output, and a signal converter having an input coupled to the output of said comparator and having an output coupled to the first input of the voltage source. The voltage source further includes a first input configured to receive the luminance input and a second input. The comparator is configured to determine an error signal based on a comparison of the luminance input and the luminance. The converter is configured to exponentially convert the error signal to a frequency. The voltage source is configured to pulse an output voltage at the frequency at the output of the voltage source.

In another exemplary embodiment, a lighting apparatus for a display having a luminance input is provided including, but not limited to a light source configured to generate a luminance based on the luminance input, a voltage source having an output configured to couple with the light source having first and second inputs, a photodetector unit configured to generate a first signal in response to the luminance and logarithmically convert the first signal to a second signal, a comparator having an input coupled to the photodetector unit and having an output, and a signal converter having an input coupled to the output of the comparator and having an output coupled to the second input of the voltage source. The first input of the voltage source is configured to receive the luminance input. The voltage source is configured to generate an output signal for powering the light source. The output signal has a voltage value, a frequency, and a pulse width. The pulse width is based on the luminance input. The comparator is configured to determine an error signal based on a comparison of the luminance input with the second signal. The converter is configured to exponentially convert the error signal to the frequency.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention is described in terms of functional block diagrams. Those of skill in the art will appreciate that such functional blocks may be realized in many different forms of hardware, firmware, and/or software components configured to perform the various functions. For example, the present invention employs various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

The present invention is a driver circuit for powering and controlling an LED based light source (e.g., backlight) for displays that is ideally suited for avionics environments. The driver circuit efficiently delivers power to the light source over a substantially wide dimming range (e.g., greater than about 50,000 to 1) and to fulfill high brightness demands typically associated with avionics displays. In heads-up displays (HUDs), such as used in the avionics environment, the invented driver circuit efficiently powers the LED light source over a wide dimming range and provides sustainable brightness levels to meet the varying operating condition of the HUDs.

Figure 1:
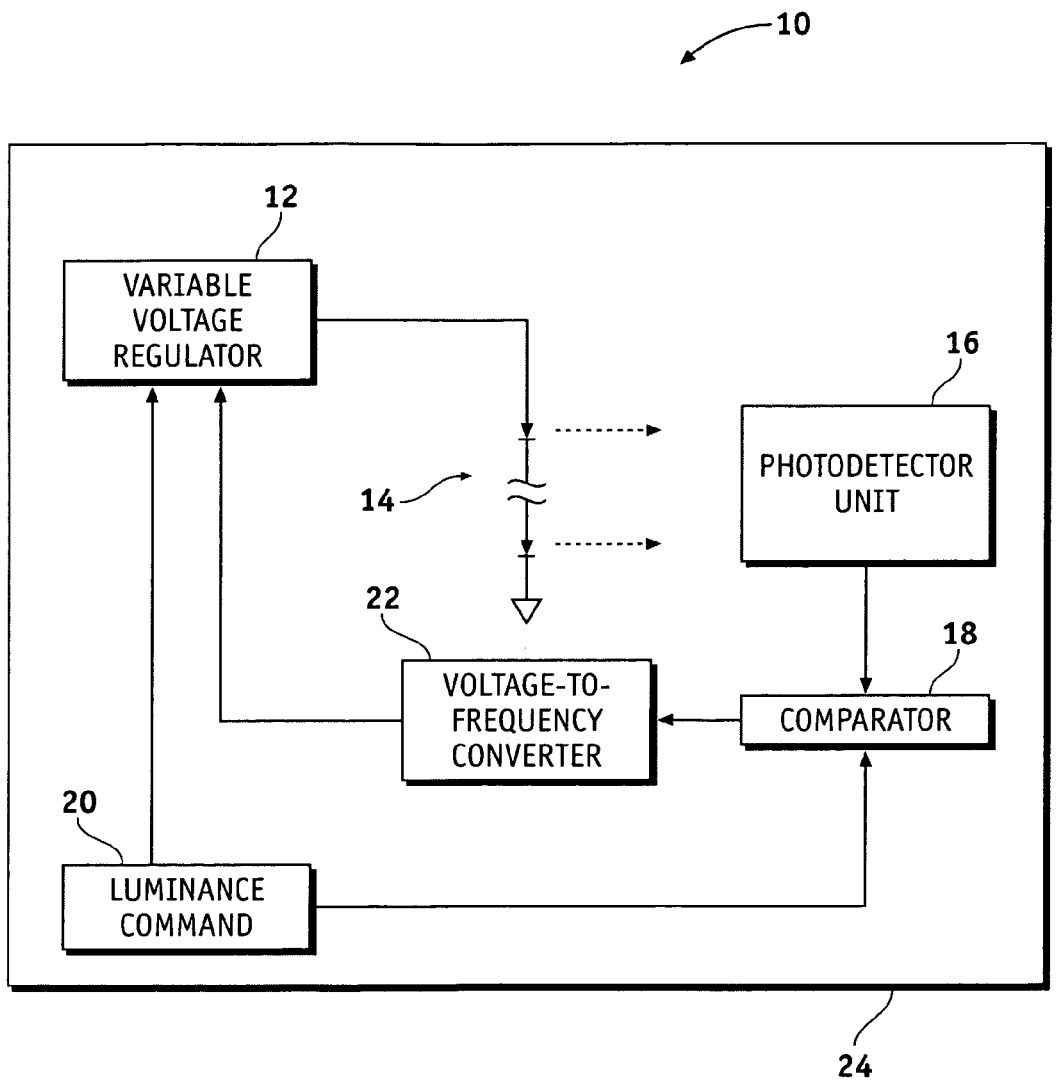
FIG. 1 is a schematic diagram showing an exemplary embodiment of a driver circuit in accordance with the present invention.

Referring to the drawings, FIG. 1 is a schematic diagram showing an exemplary embodiment of a driver circuit 10 in accordance with the present invention. The driver circuit 10 may be coupled to a light source, such as one or more light-emitting diodes 14 (LEDs), of a display 24 having, among other components, a brightness or luminance control device 20. Although the driver circuit 10 is described with respect to the LED light source 14, other light-emitting elements may be used with the display 24 and driver circuit 10.

In this exemplary embodiment, the driver circuit 10 includes, but is not limited to, a variable voltage regulator 12, a logarithmic photodetector unit 16, a comparator 18, the luminance control device 20, and a voltage-to-frequency converter 22. The variable voltage regulator 12 includes an output that is coupled with the LEDs 14, a first input coupled to the luminance control device 20, and a second input coupled to the voltage-to-frequency converter 22. The logarithmic photodetector unit 16 is configured to determine the relative luminance output from the LEDs 14. The comparator 18 includes a first input coupled to the output of the photodetector unit 16, a second input coupled to the luminance control device 20, and an output. The exponential voltage-to-frequency converter 22 includes an input coupled to the output of the comparator 18 and an output coupled to the second input of the variable voltage regulator 12. The luminance control device 20 includes an output coupled to the first input of the variable voltage regulator 12 and to the second input of the comparator 18. In response to a luminance command from the luminance control device 20 and photopic feedback (e.g., light output) from the LEDs 14, the driver circuit 10 regulates the power supplied to the LEDs 14.

The voltage regulator 12 generates an output voltage signal having a frequency and a pulse width to power and control the luminance output of the LEDs 14. In response to the luminance command from the luminance control device 20, the voltage regulator 12 adjusts the pulse width of the output voltage signal, and in response to a variable frequency signal from the converter 22, the voltage regulator 12 adjusts the frequency of the output voltage signal. For lower commanded brightness levels, the voltage regulator 12 generates an output voltage signal having a shorter pulse width and relatively lower frequency, and at higher commanded brightness levels, the voltage regulator 12 generates an output voltage signal having a relatively longer pulse width and a relatively higher frequency.

Photopic feedback from the LEDs 14 is provided by the photodetector unit 16 to the comparator 18. The amount of light generated by the LEDs 14 is measured by the photodetector unit 16 and is logarithmically compressed to produce a feedback signal. In this exemplary embodiment, the luminance command is also a logarithmic function. The comparator 18 compares the feedback signal from the photodetector unit 16 with the luminance command from the luminance control device 20 and generates an error signal that drives the voltage-to-frequency converter 22. The voltage-to-frequency converter 22 exponentially converts the error signal from the comparator 18 to a frequency signal thereby allowing greater control at lower frequencies (e.g., lower brightness levels) than a linear voltage-to-frequency converter.

Figure 2:
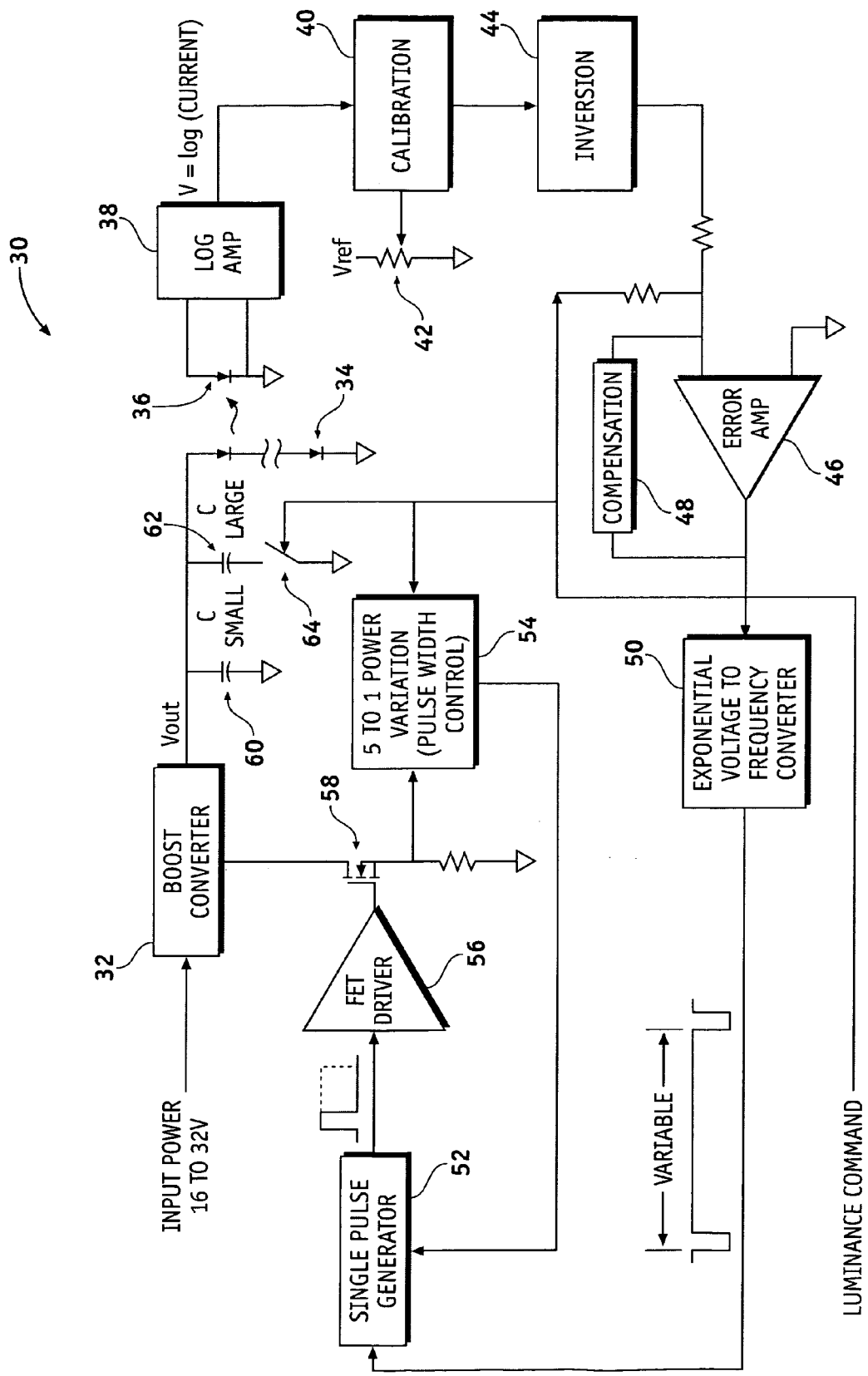
FIG. 2 is a schematic diagram illustrating a more detailed exemplary embodiment of the driver circuit shown in FIG. 1.

FIG. 2 is a schematic diagram illustrating a more detailed exemplary embodiment of the driver circuit 10 shown in FIG. 1. In this exemplary embodiment, the driver circuit 30 includes, but is not limited to, a boost converter 32 having an output for coupling with one or more strings of LEDs 34 and having a first input for receiving a supply voltage and a second input, a photodiode 36 having first and second terminals and configured to detect the light output from the LEDs 34, a logarithmic amplifier 38 having an input coupled across the terminals of the photodiode 36, a calibration circuit 40 having an input coupled to an output of the logarithmic amplifier 38, an inversion circuit 44 having an input coupled to an output of the calibration circuit 40, an error amplifier 46 having a first input coupled to a reference potential (e.g., a ground) and a second input coupled to the output of the inversion circuit 44 and the luminance command, a compensation circuit 48 coupled between an output and the second input of the error amplifier 46, an exponential voltage-to-frequency converter 50 having an input coupled to the output of the error amplifier 46, a single pulse generator 52 having a first input coupled to an output of the voltage-to-frequency converter 50 and having a second input and an output, a field-effect transistor (FET) driver 56 having an input coupled to the output of the single pulse generator 52, a metal-oxide semiconductor FET (MOSFET) switch 58 having a gate electrode coupled to an output of the FET driver 56 and having a source electrode and a body electrode coupled to the source electrode and a drain electrode coupled with the second input of the boost converter 32, and a pulse width control unit 54 having a first input coupled to the source electrode of the MOSFET switch 58, a second input for receiving the luminance command, and an output coupled to the single pulse generator 52.

Additionally, the driver circuit 30 includes a first capacitor 60 having a first terminal coupled to the output of the boost converter 32 and a second terminal coupled to a reference potential (e.g., a ground), a second capacitor 62 having a first terminal coupled to the output of the boost converter 32 and having a second terminal, and a switch 64 having an input for receiving the luminance command and for selectively coupling the second terminal of the second capacitor 62 with a reference potential (e.g., a ground). The first capacitor 60 has a relatively smaller capacitance than the second capacitor 62 and provides a base filtering of the output voltage signal from the boost converter 32 to minimize voltage spikes that may contribute to electromagnetic interference (EMI). At higher brightness levels, the output voltage signal has a higher frequency that approaches the characteristics of a direct current (DC) voltage. Upon receiving a luminance command corresponding to the higher brightness levels, the switch 64 couples the second capacitor 62 to $V_{out}$ to assist in filtering the output voltage signal. At lower brightness levels (e.g., upon receiving a luminance command corresponding to the lower brightness levels), the switch 64 decouples the second capacitor 62 from $V_{out}$.

The boost converter 32 converts a low supply voltage (e.g., 16 to 32V) to a high output voltage at $V_{out}$ and supplies the LEDs 34 with the output voltage signal. The particular supply voltage value may be selected based on conventional input voltage values used for displays. The output voltage signal has a frequency that is adjusted by the voltage-to-frequency converter 50 and has a pulse width that is adjusted by a combination of the single pulse generator 52 and the pulse width control unit 54. For each pulse transmitted by the single pulse generator 52, the single pulse generator 52 initiates a rising edge of the pulse, and the pulse width control unit 54 initiates a falling edge of the pulse. Each pulse is initiated in response to a frequency signal from the voltage-to-frequency converter 50, as described in greater detail hereinafter.

The photodiode 36 generates a current that is representative of and varies in response to the amount of light output from the LEDs 34. As the device name implies, the logarithmic amplifier 38 compresses the current value generated by the photodiode to a voltage value based on a logarithmic scale. The logarithmic amplifier 38 is capable of compressing a substantially wide range of current values (e.g., over five decades). This voltage value may be adjusted by the calibration circuit 40 with respect to a maximum brightness level, and the inversion circuit 44 inverts the voltage value for summing at the error amplifier 46. In one exemplary embodiment, the calibration circuit 40 is coupled to a variable resistor (e.g., a potentiometer) having one terminal coupled to a first reference voltage (e.g., Vref) and another terminal coupled to a second reference voltage (e.g., ground).

The error amplifier 46 compares the luminance command value with the inverted voltage value, both of which are logarithmic functions, and outputs a logarithmic error signal based on any difference between the luminance command value and the inverted voltage value. The compensation circuit 48 may be used to adjust the error signal as is well known to those of skill in the art.

The voltage-to-frequency converter 50 exponentially converts the logarithmic error signal from the error amplifier 46 to a frequency signal. The net effect of exponentially converting the logarithmic error signal to a frequency is that a small amount of change in brightness level at higher brightness levels generally amounts to a similar change at lower brightness levels. Using the logarithmic based error signal in combination with the exponential voltage-to-frequency converter 50, the driver circuit 30 provides a logarithmically scaled control over the frequency of the output voltage signal and provides a wide frequency range for variation.

The single pulse generator 52 is triggered by the frequency signal from the voltage-to-frequency converter 50 to initiate pulses at the frequency of the frequency signal. The FET driver 56 biases the gate of the MOSFET 58 to switch the boost converter 32 on and off in response to each pulse from the single pulse generator 52 and in synchronization with the frequency signal from the voltage-to-frequency converter 50. For each pulse that the boost converter 32 is switched on/off, the duration that the boost converter is switched on/off is determined by the pulse width. The pulse width control unit 54 adjusts the width of the pulse generated by the single pulse generator 52 in response to the luminance command. In one exemplary embodiment, the width is adjusted on a scale of about 5:1 power variation although other ratios of power variation may be used.

Although the invented driver circuit is described in terms of powering conventional LED based light sources, the driver circuit may also be applied to a variety of light sources having a wide dimming range. For example, the driver circuit is suited for a full-color display implementation having colored lighting elements to power and control each of such elements over a wide dimming range.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for driving a light source over a luminance range in response to a luminance input, the apparatus comprising:
    a voltage source having an output configured to couple with the light source, a first input configured to receive the luminance input, and a second input, said voltage source configured to generate an output signal at said output, said output signal having a frequency and having a pulse width based on the luminance input;
    a photodetector unit configured to logarithmically compress the luminance range and determine a first voltage based on a luminance of the light source in said logarithmically compressed luminance range;
    a comparator having an input coupled to said photodetector unit and having an output, said comparator configured to determine an error signal based on a comparison of the luminance input with said first voltage; and
    a signal converter having an input coupled to said output of said comparator and having an output coupled to said second input of said voltage source, said converter configured to exponentially convert said error signal to said frequency.

2. An apparatus according to claim 1, wherein said voltage source comprises:
    a boost converter having an output configured to couple with the light source, a first input configured to receive a first reference potential, and a second input, said boost converter configured to produce a second voltage based on said first reference potential; and
    a variable switching circuit having an output coupled to said second input of said boost converter, a first input coupled to said output of said signal converter, and a second input configured to receive the luminance input, said variable switching circuit configured to:
        adjust said pulse width in response to the luminance input; and
        control said boost converter to intermittently pulse said second voltage at said frequency and said pulse width.

3. An apparatus according to claim 2, wherein said variable switching circuit comprises:
    a pulse generator having a first input coupled to said output of said converter and having a second input and an output, said pulse generator configured to initiate a pulse at said output of said pulse generator in response to said frequency;
    a transistor driver having an input coupled to said output of said pulse generator and having an output;
    a transistor having a gate electrode, a drain electrode, and a source electrode, said gate electrode coupled to said output of said transistor driver, said drain electrode coupled to said second input of said boost converter, said transistor driver configured to intermittently power said transistor in response to said pulse from said pulse generator; and
    a pulse width controller having first and second inputs and having an output, said first input configured to receive the luminance input, a second input coupled to said source electrode, and an output coupled to said pulse generator, said pulse width controller configured to adjust said pulse width of pulse in response to the luminance input.

4. An apparatus according to claim 2 further comprising:
a first capacitor having a first terminal coupled to said output of said boost converter and having a second terminal coupled to a second reference potential;
a second capacitor having a first terminal coupled to said output of said boost converter and having a second terminal; and
a switch having first and second terminals and having a gate electrode, said first terminal of said switch coupled to said second terminal of said second capacitor, said second terminal of said switch coupled to said second reference potential, said gate electrode configured to receive the luminance input, said gate electrode configured to couple said second capacitor with said second reference potential when the luminance input exceeds a threshold value.

5. An apparatus according to claim 4, wherein said threshold value is a mid-point of said first range.

6. An apparatus according to claim 4, wherein said second reference potential is a ground.

7. An apparatus according to claim 1, wherein said photodetector unit comprises:
a photodiode having first and second terminals, said second terminal coupled to a reference potential, said photodiode configured to generate a current in response to said luminance of the light source; and
an amplifier having a first input coupled to said first terminal of said photodiode, a second input coupled to said second terminal of said photodiode, and an output, said amplifier configured to logarithmically convert said current to a second voltage.

8. An apparatus according to claim 7 further comprising:
a calibration circuit having an input coupled to said output of said amplifier and having an output, said calibration circuit configured to adjust said second voltage with respect to a maximum luminance; and
an inversion circuit having an input coupled to said output of said calibration circuit and having an output coupled to said input of said comparator, said inversion circuit configured to invert said adjusted voltage.

9. An apparatus according to claim 8, wherein said comparator comprises:
an error amplifier having first and second inputs and having an output, said first input coupled to said output of said inversion circuit and configured to receive the luminance input, said second input coupled to said second reference potential, said output coupled to said input of said converter, said error amplifier configured to:
compare said inverted voltage with the luminance input; and
generate said error signal based on a difference between said inverted voltage and the luminance input; and
a compensation circuit having first and second electrodes, said first electrode coupled to said output of said error amplifier, said second electrode coupled to said first input of said error amplifier, said compensation circuit configured to adjust said error signal.

10. A lighting apparatus for a display having a luminance input, the lighting apparatus comprising:
a light source configured to generate a luminance based on the luminance input;
a voltage source having an output configured to couple with said light source and having first and second inputs, said first input configured to receive the luminance input, said voltage source configured to generate an output signal for powering said light source, said output signal having a voltage value, a frequency, and a pulse width, said pulse width based on the luminance input;
a photodetector unit configured to:
generate a first signal in response to the luminance; and
logarithmically convert said first signal to a second signal;
a comparator having an input coupled to said photodetector unit and having an output, said comparator configured to determine an error signal based on a comparison of the luminance input with said second signal; and
a signal converter having an input coupled to said output of said comparator and having an output coupled to said second input of said voltage source, said converter configured to exponentially convert said error signal to said frequency.

11. A lighting apparatus according to claim 10, wherein said voltage source comprises:
a boost converter having an output coupled to said light source and having first and second inputs, said first input configured to receive a first potential, said boost converter configured to produce a second potential based on said first potential; and
a variable switching circuit having an output coupled to said second input of said boost converter and having first and second inputs, said first input coupled to said output of said signal converter, said second input configured to receive the luminance input, said variable switching circuit configured to:
adjust said pulse width in response to the luminance input; and
control said boost converter to intermittently output said second voltage at said frequency and said pulse width.

12. A lighting apparatus according to claim 11, wherein said variable switching circuit comprises:
a pulse generator having a first input coupled to said output of said converter and having a second input and an output, said pulse generator configured to initiate a pulse in response to said frequency from said signal converter;
a transistor driver circuit having an input coupled to said output of said pulse generator and having an output;
a transistor having a gate electrode, a drain electrode, and a source electrode, said gate electrode coupled to said output of said transistor driver circuit, said drain electrode coupled to said second input of said boost converter, said transistor driver circuit configured to intermittently power said transistor in response to said pulse from said pulse generator; and
a pulse width controller having first and second inputs and having an output, said first input configured to receive the luminance input, said second input coupled to said source electrode, said output coupled to said pulse generator, said pulse width controller configured to adjust said pulse width in response to the luminance input.

13. A lighting apparatus according to claim 12, wherein said pulse width controller is configured to adjust said pulse width on a 5:1 ratio in response to the luminance input.

14. A lighting apparatus according to claim 11 further comprising:

a first capacitor having a first terminal coupled to said output of said boost converter and having a second terminal coupled to a reference potential;

a second capacitor having a first terminal coupled to said output of said boost converter and having a second terminal; and a switch having first and second terminals and having a gate electrode, said first terminal of said switch coupled to said second terminal of said second capacitor, said second terminal of said switch coupled to said reference potential, said gate electrode configured to receive the luminance input, said gate electrode configured to couple said second capacitor with said reference potential when the luminance input exceeds a threshold value.

15. A lighting apparatus according to claim 14, wherein said reference potential is a ground.

16. A lighting apparatus according to claim 11, wherein said first potential is selected from about 16V to about 32V.

17. A lighting apparatus according to claim 10, wherein said photodetector unit comprises:

a photodiode having first and second terminals, said second terminal coupled to a reference potential, said photodiode configured to generate a current in response to said luminance of the light source; and an amplifier having first and second inputs and having an output, said first input coupled to said first terminal of said photodiode, said second input coupled to said second terminal of said photodiode, said amplifier configured to logarithmically convert said current to a first voltage.

18. A lighting apparatus according to claim 17 further comprising:

a calibration circuit having an input coupled to said output of said amplifier and having an output, said calibration circuit configured to adjust said first voltage with respect to a maximum luminance; and an inversion circuit having an input coupled to said output of said calibration circuit and having an output coupled to said input of said comparator, said inversion circuit configured to invert said adjusted voltage.

19. An apparatus according to claim 18, wherein said comparator comprises:

an error amplifier having first and second inputs and having an output, said first input coupled to said output of said inversion circuit and configured to receive the luminance input, said second input coupled to a reference potential, said output coupled to said input of said converter, said error amplifier configured to:

compare said inverted voltage with the luminance input; and generate said error signal based on a difference between said inverted voltage and the luminance input.

20. An apparatus according to claim 19, wherein said comparator comprises:

a compensation circuit having first and second electrodes, said first electrode coupled to said output of said error amplifier, said second electrode coupled to said first input of said error amplifier, said compensation circuit configured to adjust said error signal.

* * * * *